Aug. 9, 1960   S. CANNELLA   2,948,319
AUTOMATIC ANTI-SKID CHAINS FOR AUTOMOBILES
Filed Feb. 2, 1959   3 Sheets-Sheet 1
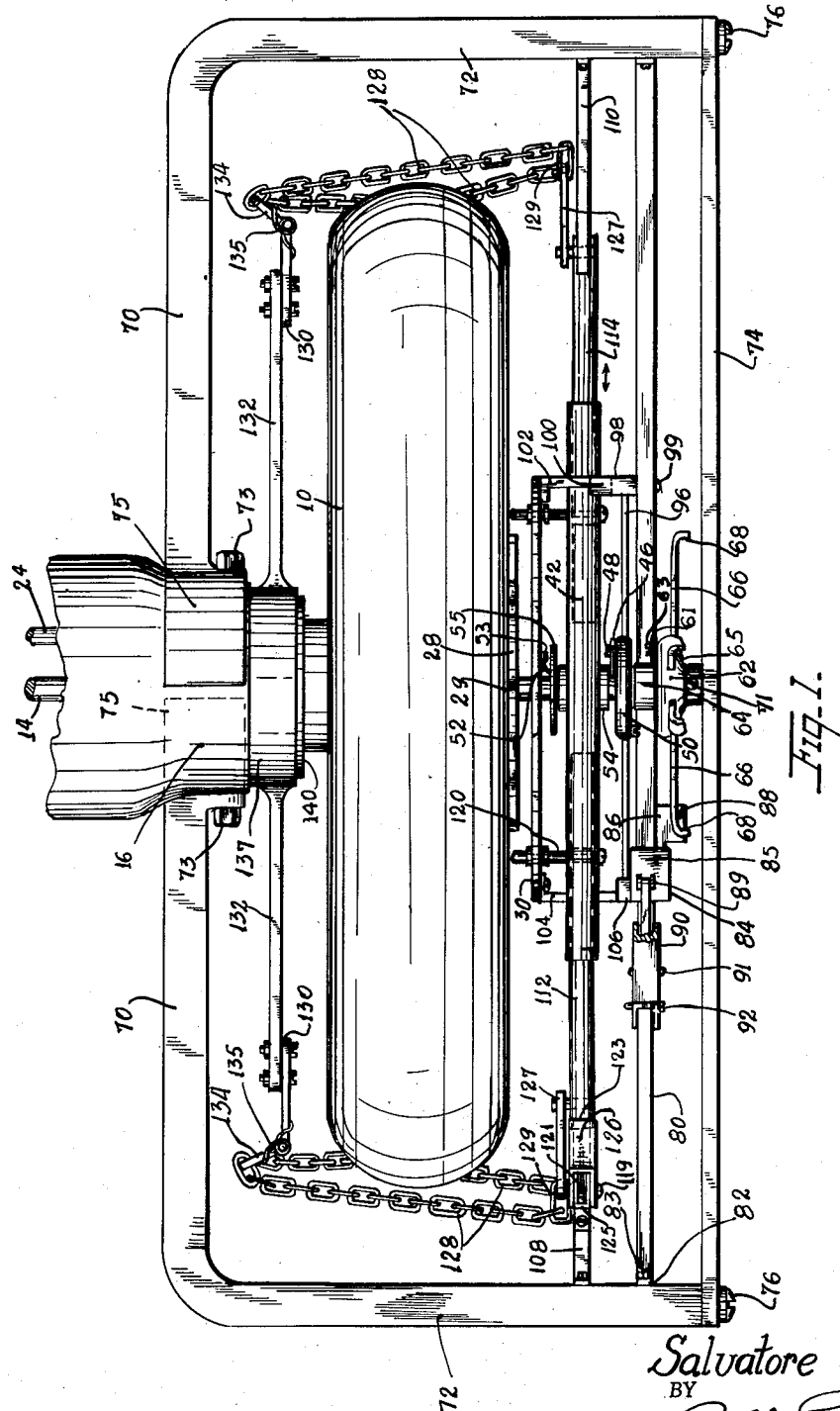
Fig. 1.
INVENTOR.
Salvatore Cannella
BY
ATTORNEY Aug. 9, 1960  S. CANNELLA  2,948,319
AUTOMATIC ANTI-SKID CHAINS FOR AUTOMOBILES
Filed Feb. 2, 1959  3 Sheets-Sheet 2

INVENTOR.
Salvatore Cannella
BY
ATTORNEY

Aug. 9, 1960  S. CANNELLA  2,948,319
AUTOMATIC ANTI-SKID CHAINS FOR AUTOMOBILES
Filed Feb. 2, 1959  3 Sheets-Sheet 3
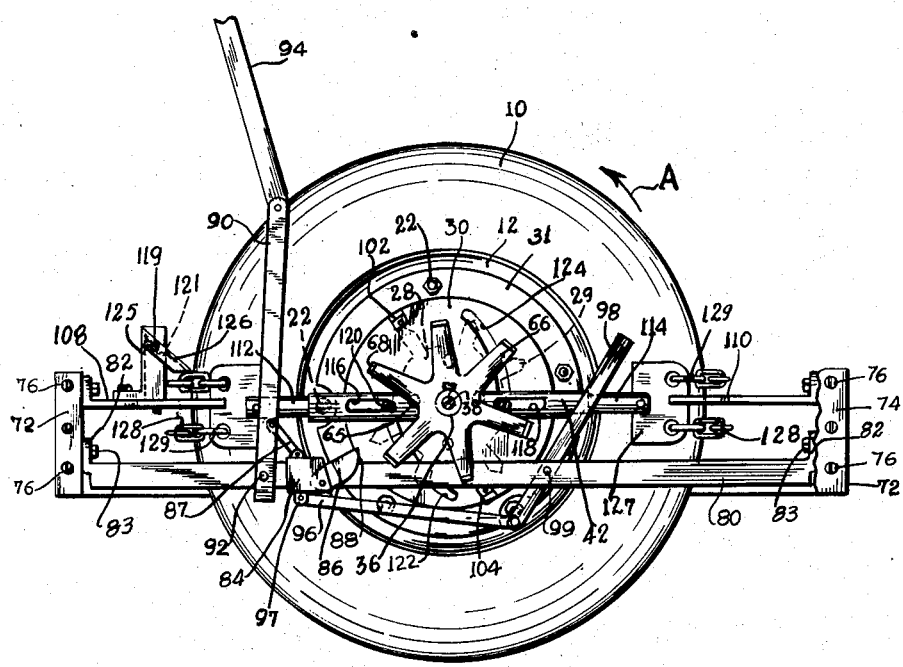
Fig. 5.
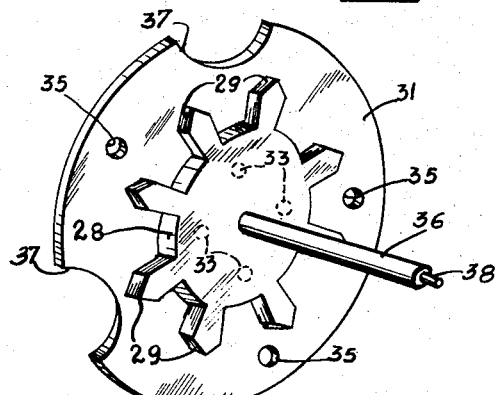
Fig. 4.
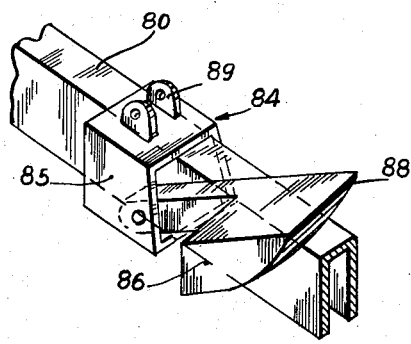
Fig. 6.
INVENTOR.
Salvatore Cannella
BY
ATTORNEY though 2,948,319
Patented Aug. 9, 1960

United States Patent Office

2,948,319
AUTOMATIC ANTI-SKID CHAINS FOR AUTOMOBILES

Salvatore Cannella, 1432 Needham Ave., Bronx, N.Y.

Filed Feb. 2, 1959, Ser. No. 790,573

11 Claims. (Cl. 152—214)

This invention relates to anti-skid devices, and more particularly to a device for use upon wheels of motor vehicles such as automobiles, trucks, buses and the like.

Heretofore, many types of anti-skid devices have been proposed, but due to the difficulty of attachment and removal from the wheel, none of the devices has been adopted on a large scale. The use of conventional chains which are manually attached to the tire and which are ridden upon until manually removed is inconvenient, as the chains must be removed after each use and attached again whenever snow, ice, or other difficult road conditions occur. Various mechanisms have been proposed for attaching anti-skid devices but none has come into widespread use due to their complexity, difficulty of installation and servicing, etc.

The present invention is directed at overcoming the disadvantages of prior mechanically operated anti-skid attachment devices. A principal object of the invention is to provide an anti-skid device that may be readily attached to a wheel of a motor vehicle, which may be carried by the vehicle at all times and that may be moved into position about the tread portion of the vehicle tire to prevent skidding of the vehicle.

A further object of the invention is to provide an anti-skid device that may be easily moved into operative position by the driver of a vehicle from the driver's seat.

A still further object of the invention is to provide an anti-skid device that may be mounted permanently upon a wheel of a vehicle and may be moved into operative position instantly, such upon the occurrence of an emergency road condition, and may be moved into inoperative position when no longer required.

A still further object of the invention is to provide an anti-skid device for a wheel of a motor vehicle that may be operated from the driver's seat while the vehicle is in motion.

These and other objects are accomplished according to the invention wherein one or more pairs of chains are carried loosely near a vehicle wheel and are adapted to be moved into operative position by actuation of a lever from the driver's seat, so that the chains engage the tire tread instantly.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view of an anti-skid device according to the invention shown in disengaged position with respect to the wheel of a vehicle, parts being broken away.

Fig. 4 is a perspective view of a toothed drive wheel unit employed in the device.

Fig. 5 is a view similar to Fig. 2 showing the parts in operative position, with chains engaged upon the tire of the wheel.

Fig. 6 is a detail perspective view of the carriage.

Figure 3:
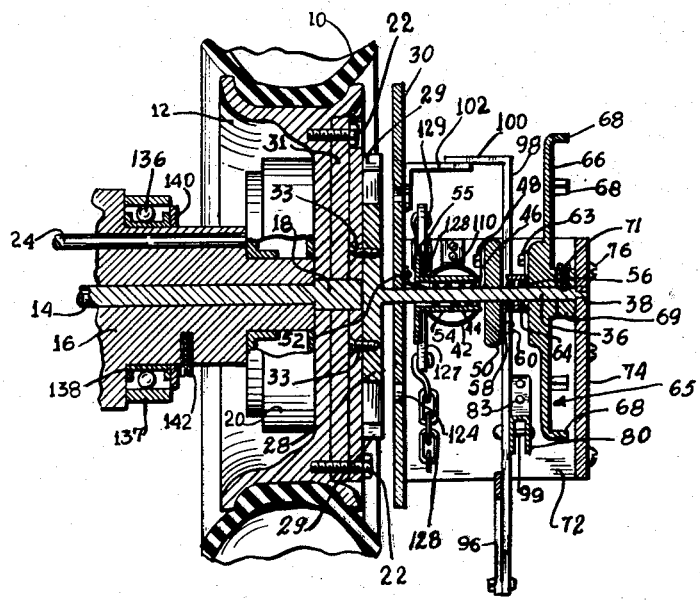
Fig. 3 is a sectional view taken on line 3—3 of Fig. 2, on a larger scale.

Referring to the drawings, there is shown a conventional pneumatic tire 10 mounted on a disk wheel 12. The wheel is mounted on and rotates with a shaft or axle 14 axially extending through shaft or axle housing 16 of the vehicle. The shaft may be provided with splines 18 for keying the wheel to the shaft as shown in Fig. 3. A conventional brake drum 20 is secured to the wheel by bolts (not shown), and the brake is provided with the usual hydraulic line 24 for applying brake fluid to the brake mechanism for stopping rotation of the wheel with respect to the axle 14. The structure described to this extent is conventional.

The anti-skid device includes a toothed wheel 28 secured to one side of a disk 31 by means of bolts 33 as best shown in Fig. 4. The wheel and disk are mounted as a unit and said unit is secured to the outside surface of the disc body of the wheel 12 by means of bolts 22 passing through openings 35 in the disk 31 extending into the wheel 12. The disk 31 is formed with peripheral notches 37 to provide clearance for fastening elements. The toothed wheel is formed at its center with an elongated extension disposed in alignment with the shaft 14 and constituting a shaft extension 36. The anti-skid mechanism proper is supported on the shaft extension 36 and includes a circular plate or disk 30 having a central opening through which the shaft extension 36 extends. Shaft extension 36 passes diametrally through a tube 42 which can pivot with respect to the shaft extension. A coil spring 44 encircles shaft extension 36 and also extends through tube 42. One end 46 of the spring is secured by screw 48 to one side of a disk 50 and the other end 52 of the spring is secured by a screw 53 to plate 30. Disk 50 is frictionally fitted on shaft extension 36 and can rotate with respect to this shaft extension. Another disk 55 is mounted on shaft extension 36 near plate 30 to confine the spring 44 against axial movement and a short sleeve 54 encircles the body of the spring to prevent radial expansion during operation of the device.

The end 46 of the spring extends out of one open end of sleeve 54 and the end 52 extends out of the other open end of the sleeve 54 and through a hole in disk 55 to terminate on plate 30.

A second coil spring 56 is mounted on shaft extension 36 and has one end 58 secured to the other side of disk 50 by screw 60. The other end 61 of spring 56 is secured on the inner side of a plate 62 by screw 63. A short sleeve 64 can be mounted over the spring 56 to prevent radial expansion during operation of the device. Plate 62 is the apertured central part of a star wheel 65 which has a plurality of radially extending arms 66 terminating in hooked ends 68. Plate 62 is frictionally fitted on shaft extension 36 and is carried around by friction with the shaft extension 36 unless held against such movement. A collar 69 is placed on shaft extension 36 outwardly of wheel 65 and is held in place by a setscrew 71 that permits disassembly of the unit without danger of the parts falling off.

Secured to the axle housing 16 by means of bolts 73 are semicircular bearing plates 75 and formed integrally with the plates 75 are L-shaped plates 70, one leg extending parallel to the wheel 12 and the other leg 72 extending perpendicularly thereto. A plate 74 is longitudinally disposed outside the wheel and is removably secured to the free ends of legs 72 by bolts 76. Plate 74 is shown partially broken away from the device in Figs. 2 and 5 to show interior parts more clearly. The ends of legs 72 are provided with threaded holes 78 to receive bolts 76. The tip 38 of shaft extension 36 is journaled in plate 74. Mounted on legs 72 is a channel bar 80. This bar has upturned ends 82 secured by screws 83 to legs 72.

On this bar is slidably mounted a carriage member 84. This member comprises a tubular body 85 sleeved around the bar 80. A dog 86 is pivotally supported in the body on one side thereof and is formed with a nose portion 88 extending laterally of the body of the dog for engaging the hooked ends 68 of the arms 66 of the star wheel 65 and preventing its rotation on shaft extension 36.

A link 87 is pivotally engaged in bracket elements 89 on the carriage member and is pivotally secured by pin 91 to a lever 90. Lever 90 has one end pivotally engaged by pin 92 to bar 80. The other end of the lever is pivotally connected to a link or handle 94 which terminates near the driver's position in the vehicle for operation by the driver while the vehicle is in motion.

Another link 96 is pivotally secured to bracket element 97 located at the bottom of carriage member 84. Pivotally connected to this link is a lever 98 which pivots on pin 99 mounted in bar 80. Lever 98 has an inwardly extending bent finger 100 positioned to engage either bar 102 or bar 104 mounted at diagonally opposite points on plate 30 and extending outwardly therefrom. Carriage member 84 has a laterally extending finger 106 positioned to engage one of bars 102 and 104 when the carriage member is advanced to the position shown in Figs. 1 and 2. Two flat bars 108 and 110 are secured to respective legs 72 and extend toward each other. These bars are positioned to engage rods 112, 114 which are axially slidable in tube 42. Slots 116, 118 are formed in the side of tube 42 and are spaced longitudinally from each other. Pins 120 of heavy gauge extend through the slots and through inner ends of rods 112, 114 in the tube.

The inner ends of the pins are slidably engaged in spaced spiral slots 122 and 124 formed in plate 30. These spiral slots are so located that rotation of plate 30 with respect to tube 42 will cause rods 112 and 114 to be extended from or retracted axially into tube 42.

Mounted on bar 108 is an upstanding channel shaped bracket 125. A pivot pin 119 extending through the flanged sides of the bracket pivotally supports a finger member 126 having a slanting nose portion 123 at its free end. A tension spring 121 is sleeved around the pivot pin 119 with one end anchored on the bracket 125 and its other end impinged against the finger member 126 whereby said finger member is normally pressed in downward condition as shown in Fig. 5 against the outer end of the rod 112 when this rod is fully extended from the tube. On the outer end of each rod 112 and 114 is a pivotally mounted plate 127. Two chains 128 are removably secured to each plate 127 by hook links 129 at one end. The other ends of the chains are connected to bars 130 carried by arms 132. Each bar 130 has a perforated pivoted extension 134 normally pressed in a direction away from the wheel 12 by a spring 135, adapted to support and tension the chains on opposite sides of the tire 10 when rods 112, 114 are retracted. Other flexible elements might be used in place of chains.

Arms 132 are flat members which are secured radially to a cylindrical band 137. This band is freely rotatable on axle housing 16. To insure free rotation of the band, ball bearings 136 retained in a race 138 are located between the band and axle housing. A washer 140 and a setscrew 142, which setscrew is anchored in the axle housing, retain the band and ball bearing race on the axle housing.

Figure 2:
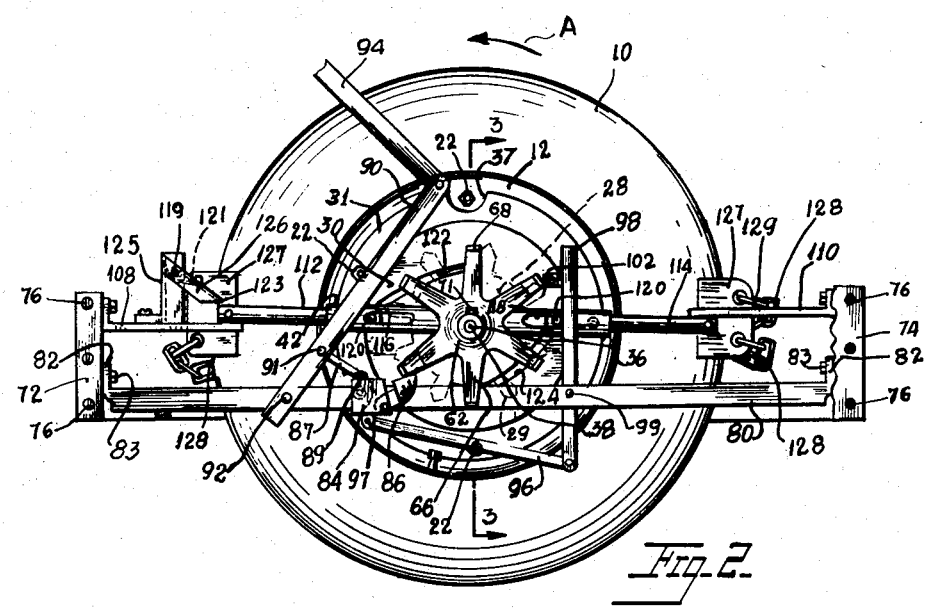
Fig. 2 is a side elevational view of the device, on a smaller scale, the parts being shown in inoperative position, parts being broken away.

Figs. 1, 2 and 3 show the chains 128 disengaged from the tire. Operation of the device is accomplished by extending the rods 112 and 114 to their maximum extent from tube 42. In this disengaged position of the device, pins 120 are near the outermost ends of slots 116 and 118 in tube 42 and pass through the outermost points of the spirally arcuate slots 122 and 124 at their points of maximum radius from the center of plate 30. The upper and lower fingers 102 and 104 are engaged by fingers 100 and 106, respectively, which prevent rotation of the plate. The wheel 65 is assumed rotating with shaft extension 36 in the direction of arrow A in Fig. 2. Shaft 14 and its extension 36 are rotating together in the direction of arrow A. The star wheel 65 rotates because of the frictional engagement of center plate 62 on shaft extension 36. Tube 42 and its rods 112, 114 are held against pivotal movement by the engagement of the ends of the rods on bars 108 and 110. The outer end of rod 112 is engaged under finger 126 which prevents vibration of the rod and tube assembly while the vehicle is in motion. Springs 44 and 56 slip with respect to the rotating shaft extension 36 on which they are frictionally fitted. If desired, spring 44 can be a heavier spring and can grip shaft extension 36 with greater force than spring 56. Carriage 84 is extended rearwardly by means of levers 94 and 90 and link 87 so nose 88 of dog 86 engages the hooked end 68 of an arm 66 of wheel 65 and holds the star wheel 65 against counterclockwise rotation as viewed in Fig. 2. The pivotal mounting of the dog 86, however, permits clockwise rotation of the wheel in case of accident or emergency.

While the vehicle is moving forwardly with the wheel rotating as indicated by arrow A, the handle 94 can be pulled upwardly to the position indicated in Fig. 5. This will cause the carriage member 84 to be retracted to disengage and release the star wheel 65. Wheel 65 will turn with shaft extension 36 and this will tension spring 56 until it turns disk 50. The rotation of disk 50 will increase the tension on spring 44 which will in turn cause plate 30 to rotate. Plate 30 is enabled to rotate because the upward actuation of handle 94 causes lever 98 to pivot and clear finger 100 from finger 102. The retraction of the carriage member clears finger 106 from finger 104. The plate 30 rotates initially about a quarter turn or through ninety degrees of arc. The angular movement of the plate 30 guides pins 120 to retract bars 112 and 114 inwardly into tube 42 until the pins 120 are located at points of minimum radius of slots 122 and 124 and carried to points between the teeth 29 on wheel 28. The retraction of the bars 112, 114 clears them from bars 108, 110 and at the same time snugly engages the pairs of chains at diametrally opposed positions on tire 10. The pins 120 are now interlocked with the teeth 29 on wheel 28 and extend through tube 42 whereby the tube 42 with its retracted rods, plate 30, star wheel 65, band 137, arms 132 and the chains 128 all rotate together as a unit with the tire 10 to effect the desired anti-skid action.

The actuation of the anti-skid device occurs instantly upon actuation of the handle 94 by the driver of the vehicle. It will be understood that the handle lever 94 might be actuated electrically by means of a push button. In general the chains will be applied in the time required for no more than a single revolution of wheel 12.

It will be understood that similar anti-skid devices will be mounted on two or more of the wheels of the vehicle so that the anti-skid action will be balanced. The handles 94 of the several devices will preferably be connected together to provide a single control at the driver's position in the vehicle.

To disengage the chains from the wheel, handle 94 will be lowered to the position shown in Fig. 2, this will advance the carriage member 84 rearwardly on bar 80 so that nose 88 of dog 86 engages the hook 68 of the next approaching arm 66 of the star wheel 65. Rotation of the star wheel 65 will thus be halted. This will permit spring 56 to unwind so that the disk 50, spring 44 and plate 30 slow up in turn. During the half cycle of rotation of the tire following actuation of handle 94, plate 30 will be halted because fingers 102 and 104 of this plate will become engaged upon fingers 100 and 106. Tube 42 and its associated rods will tend to continue rotation with shaft extension 36 because of the inertia in this assembly and because of the snug engagement of the chains on the tire. Thus, a relative rotation occurs between rotating tube 42 and stationary plate 30, which results in rods 112 and 114 being extended axially with respect to tube 42. Pins 120 guide the rods while they move outwardly. As soon as the rods 112 and 114 move outwardly they become engaged upon the upper side of bar 108 and the underside of bar 110, so that rotation of the rods and tube is stopped in the position shown in Fig. 2. The spring 126 becomes engaged upon the upper side of the extended adjacent rod 112. The extension of the rods results in loosening of the chains so that they are clear of the tire.

There has thus been provided a means for applying an anti-skid device to a wheel while it is in motion. Advantage is taken to the rotation of the wheel and its supporting shaft in both engaging and disengaging the device. The faster the wheel of the vehicle is turning, the faster the anti-skid device is engaged and disengaged. This is particularly important if an emergency condition suddenly occurs which requires immediate application of anti-skid chains. The anti-skid device is actually self-actuating, since operation of the handle 94 only indirectly applies and disengages the device.

It is to be understood that the handle of link 94 may be located at any suitable place on the dashboard of an automobile and instead of a handle 94, the operating means may also be one or more electric buttons connected to suitable solenoids which are to actuate the link 94.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An anti-skid device for a wheel rotatably mounted on an axle, in a stationary axle housing, comprising a tube, a pair of rods telescopically mounted in opposite ends of the tube, a band rotatably mounted on the axle housing, chains connected between outer ends of the rods and said band, means for retracting said rods so that the chains engage the wheel and for extending the rods so that the chains disengage the wheel, means for holding the tube and rods stationary while the chains are disengaged from the wheel, and means for rotating the tube, rods and band together with the wheel when the chain are engaged with the wheel.

2. An anti-skid device for a wheel rotatably mounted on a shaft in a stationary shaft housing, comprising a tube, a pair of rods telescopically mounted in opposite ends of the tube, a shaft extension engaged with said shaft and rotatable therewith, said shaft extension passing diametrally through said tube and rotatable with respect to the tube, a band rotatably mounted on said shaft housing, chains connected between outer ends of the rods and said band, and means for retracting and extending the rods with respect to the tube for engaging and disengaging said chains with said wheel.

3. An anti-skid device for a wheel rotatably mounted on a shaft in a stationary shaft housing, comprising a tube, a pair of rods telescopically mounted in opposite ends of the tube, a shaft extension engaged with said shaft and rotatable therewith, said shaft extension passing diametrally through said tube and rotatable with respect to the tube, a band rotatably mounted on said shaft housing, chains connected between outer ends of the rods and said band, and means for retracting and extending the rods with respect to the tube for engaging and disengaging said chains with said wheel, said means comprising a plate rotatably mounted on said shaft extension, said plate having arcuate spiral slots therein, said tube having longitudinal slots therein, and pins passing through the slots in the tube, inner ends of the rods and the slots in the plate for guiding the rods into and out of the tube.

4. An anti-skid device for a wheel rotatably mounted on a shaft in a stationary shaft housing, comprising a tube, a pair of rods telescopically mounted in opposite ends of the tube, a shaft extension engaged with said shaft and rotatable therewith, said shaft extension passing diametrally through said tube and rotatable with respect to the tube, a band rotatably mounted on said shaft housing, chains connected between outer ends of the rods and said band, and means for retracting and extending the rods with respect to the tube for engaging and disengaging said chains with said wheel, said means comprising a plate rotatably mounted on said shaft extension, said plate having arcuate spiral slots therein, said tube having longitudinal slots therein, and pins passing through the slots in the tube, inner ends of the rods and the slots in the plate for guiding the rods into and out of the tube, a star wheel secured on said shaft extension for rotation therewith, spring means connecting the star wheel and said plate.

5. An anti-skid device for a wheel of a vehicle rotatably mounted on a shaft in a stationary shaft housing, comprising a tube, a pair of rods telescopically mounted in opposite ends of the tube, a shaft extension engaged with said shaft and rotatable therewith, said shaft extension passing diametrally through said tube and rotatable with respect to the tube, a band rotatably mounted on said shaft housing, arms radially extending from said band, chains connected between outer ends of the rods and said arms, a plate rotatably mounted on said shaft extension, said plate having arcuate spiral slots therein, said tube having spaced longitudinal slots therein, and pins passing through the slots in the tube, inner ends of the rods and the slots in the plate for guiding the rods into and out of the tube.

6. An anti-skid device for a wheel of a vehicle rotatably mounted on a shaft in a stationary shaft housing, comprising a tube, a pair of rods telescopically mounted in opposite ends of the tube, a shaft extension connected to said shaft and rotatable therewith, said shaft extension passing diametrally through said tube and rotatable with respect to the tube, a band rotatably mounted on said shaft housing, arms radially extending from said band, chains connected between outer ends of the rods and said arms, a plate rotatably mounted on said shaft extension, said plate having arcuate spiral slots therein, said tube having spaced longitudinal slots therein, and pins passing through the slots in the tube, inner ends of the rods and the slots in the plate for guiding the rods into and out of the tube, a star wheel secured on said shaft extension for rotation therewith, spring means connecting the star wheel and said plate, and a carriage member manually positionable to prevent the star wheel from rotating on said shaft extension and to release the star wheel for rotation with said shaft extension.

7. An anti-skid device for a wheel of a vehicle rotatably mounted on a shaft in a stationary shaft housing, comprising a tube, a pair of rods telescopically mounted in opposite ends of the tube, a shaft extension connected to said shaft and rotatable therewith, said shaft extension passing diametrally through said tube and rotatable with respect to the tube, a band rotatably mounted on said shaft housing, arms radially extending from said band, chains connected between outer ends of the rods and said arms, a plate rotatably mounted on said shaft extension, said plate having arcuate spiral slots therein, said tube having spaced longitudinal slots therein, and pins passing through the slots in the tube, inner ends of the rods and the slots in the plate for guiding the rods into and out of the tube, a star wheel frictionally fitted on said shaft extension for rotation therewith, spring means connecting the starwheel and said plate, and a carriage member manually positionable to prevent the star wheel from rotating on said shaft extension and to release the star wheel for rotation with said shaft extension, said spring means comprising a first coil spring mounted axially on said shaft extension and connected to said star wheel, and a second coil spring mounted axially on said shaft extension and connected between the first spring and said plate, the second spring being heavier than the first spring and gripping said shaft extension more strongly than the first spring.

8. An anti-skid device for a wheel of a vehicle rotatably mounted on a shaft in a stationary shaft housing, comprising a tube, a pair of rods telescopically mounted in opposite ends of the tube, a shaft extension connected to said shaft and rotatable therewith, said shaft extension passing diametrally through said tube and rotatable with respect to the tube, a band rotatably mounted on said shaft housing, arms radially extending from said band, chains connected between outer ends of the rods and said arms, a plate rotatably mounted on said shaft extension, said plate having arcuate spiral slots therein, said tube having spaced longitudinal slots therein, and pins passing through the slots in the tube, inner ends of the rods and the slots in the plate for guiding the rods into and out of the tube, a star wheel frictionally fitted on said shaft extension for rotation therewith, spring means connecting the star wheel and said plate, and a carriage member manually positionable to prevent the star wheel from rotating on said shaft extension and to release the star wheel for rotation with said shaft extension, said spring means comprising a first coil spring mounted axially on said shaft extension and connected to said star wheel, and a second coil spring mounted axially on said shaft extension and connected between the first spring and said plate, the second spring being heavier than the first spring and gripping said shaft extension more strongly than the first spring, and a lever pivotally mounted for engaging an extending portion of said plate, said carriage member having a portion mounted for engaging another portion of said plate to prevent rotation thereof.

9. An anti-skid device for a wheel of a vehicle rotatably mounted on a shaft in a stationary shaft housing, comprising a tube, a pair of rods telescopically mounted in opposite ends of the tube, a shaft extension connected to said shaft and rotatable therewith, said shaft extension passing diametrally through said tube and rotatable with respect to the tube, a band rotatably mounted on said shaft housing, arms radially extending from said band, chains connected between outer ends of the rods and said arms, a plate rotatably mounted on said shaft extension, said plate having arcuate spiral slots therein, said tube having spaced longitudinal slots therein, and pins passing through the slots in the tube, inner ends of the rods and the slots in the plate for guiding the rods into and out of the tube, a star wheel frictionally fitted on said shaft extension for rotation therewith, spring means connecting the star wheel and said plate, and a carriage member manually positionable to prevent the star wheel from rotating on said shaft extension and to release the star wheel for rotation with said shaft extension, said spring means comprising a first coil spring mounted axially on said shaft extension and connected to said star wheel, and a second coil spring mounted axially on said shaft extension and connected between the first spring and said plate, the second spring being heavier than the first spring and gripping said shaft extension more strongly than the first spring, and a lever pivotally mounted for engaging an extending portion of said plate, said carriage member having a portion mounted for engaging another portion of said plate to prevent rotation thereof, a pair of spaced parallel plates providing a support, another plate removably connected to said spaced plates, said shaft extension having an outer end journaled in said other plate, and a bar connected between said pair of plates and supporting said carriage member and lever.

10. An anti-skid device for a wheel of a vehicle rotatably mounted on a shaft in a stationary shaft housing, comprising a tube, a pair of rods telescopically mounted in opposite ends of the tube, a shaft extension connected to said shaft and rotatable therewith, said shaft extension passing diametrally through said tube and rotatable with respect to the tube, a band rotatably mounted on said shaft housing, arms radially extending from said band, chains connected between outer ends of the rods and said arms, a plate rotatably mounted on said shaft extension, said plate having arcuate spiral slots therein, said tube having spaced longitudinal slots therein, and pins passing through the slots in the tube, inner ends of the rods and the slots in the plate for guiding the rods into and out of the tube, a star wheel frictionally fitted on said shaft extension for rotation therewith, spring means connecting the star wheel and said plate, a carriage member manually positionable to prevent the star wheel from rotating on said shaft extension and to release the star wheel for rotation with said shaft extension, said spring means comprising a first coil spring mounted axially on said shaft extension and connected to said star wheel, a second coil spring mounted axially on said shaft extension and connected between the first spring and said plate, the second spring being heavier than the first spring and gripping said shaft extension more strongly than the first spring, a lever pivotally mounted for engaging an extending portion of said plate, said carriage member having a portion mounted for engaging another portion of said plate to prevent rotation thereof, a pair of spaced parallel plates providing a support, another plate removably connected to said spaced plates, said shaft extension having an outer end journaled in said other plate, a bar connected between said pair of plates and supporting said carriage member and lever, and a pair of short bars secured to said pair of plates and extending inwardly toward said rods so that the outer ends of the rods become engaged on said short bars upon extension from the tube, said outer ends of the rods clearing said short bars when retracted in the tube.

11. An anti-skid device for a wheel of a vehicle rotatably mounted on a shaft in a stationary shaft housing, comprising a tube, a pair of rods telescopically mounted in opposite ends of the tube, a shaft extension connected to said shaft and rotatable therewith, said shaft extension passing diametrally through said tube and rotatable with respect to the tube, a band rotatably mounted on said shaft housing, arms radially extending from said band, chains connected between outer ends of the rods and said arms, a plate rotatably mounted on said shaft extension, said plate having arcuate spiral slots therein, said tube having spaced longitudinal slots therein, and pins passing through the slots in the tube, inner ends of the rods and the slots in the plate for guiding the rods into and out of the tube, a star wheel frictionally fitted on said shaft extension for rotation therewith, spring means connecting the star wheel and said plate, a carriage member manually positionable to prevent the star wheel from rotating on said shaft extension and to release the star wheel for rotation with said shaft extension, said spring means comprising a first coil spring mounted axially on said shaft extension and connected to said star wheel, a second coil spring mounted axially on said shaft extension and connected between the first spring and said plate, the second spring being heavier than the first spring and gripping said shaft extension more strongly than the first spring, a lever pivotally mounted for engaging an extending portion of said plate, said carriage member having a portion mounted for engaging another portion of said plate to prevent rotation thereof, a pair of spaced parallel plates providing a support, another plate removably connected to said spaced plates, said shaft extension having an outer end journaled in said other plate, a bar connected between said pair of plates and supporting said carriage member and lever, a pair of short bars secured to said pair of plates and extending inwardly toward said rods so that the outer ends of the rods become engaged on said short bars upon extension from the tube, said outer ends of the rods clearing said short bars when retracted in the tube, and a handle linked to said carriage member and said lever and manually operable to release the star wheel and first-named plate, whereby the plate rotates said tube and retracts said rods to engage the chains on the wheel of the vehicle, and further manually operable to engage the star wheel to stop rotation of the first-named plate, whereby the tube is rotated by the vehicle wheel with respect to the first-named plate to extend the rods for engagement by said short bars and to disengage the chains from the wheel of the vehicle.

References Cited in the file of this patent
UNITED STATES PATENTS

| | | |
|---|---|---|
| 1,593,129 | Matthews | July 20, 1926 |
| 2,614,600 | Wheeler | Oct. 21, 1952 |
| 2,720,238 | McClelland | Oct. 11, 1955 |